(12) United States Patent
Sasaki et al.

(10) Patent No.: US 6,556,024 B2
(45) Date of Patent: Apr. 29, 2003

(54) CAPACITANCE TYPE LOAD SENSOR

(75) Inventors: Katsutoshi Sasaki, Tokyo (JP); Ken Obata, Tokyo (JP); Hiroyuki Yamazaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/819,958

(22) Filed: Mar. 28, 2001

(65) Prior Publication Data

US 2001/0026163 A1 Oct. 4, 2001

(30) Foreign Application Priority Data

Mar. 29, 2000 (JP) ........................................ 2000-091137

(51) Int. Cl.⁷ .............................................. G01R 27/26
(52) U.S. Cl. .................................. 324/660; 73/862.626
(58) Field of Search ........................... 73/841, 862.626; 324/660

(56) References Cited

U.S. PATENT DOCUMENTS

| | | | |
|---|---|---|---|
| 4,125,777 A | 11/1978 | O'Brien et al. | |
| 4,386,386 A | 5/1983 | Akita | 73/862.626 |
| 4,899,600 A | 2/1990 | Lee | 73/862.626 |
| 5,602,411 A | 2/1997 | Zettler | 73/514.32 |
| 6,218,632 B1 * | 4/2001 | McCarthy | 73/862.626 |
| 6,341,532 B1 * | 1/2002 | Xu | 73/841 |

FOREIGN PATENT DOCUMENTS

| | | |
|---|---|---|
| DE | 199 59 128 | 6/2000 |
| FR | 2 459 462 | 1/1981 |
| GB | 2 076 970 | 12/1981 |
| JP | 08-5472 | * 1/1996 |
| JP | 08-5481 | * 1/1996 |

OTHER PUBLICATIONS

European Search Report dated Jul. 5, 2001.

* cited by examiner

*Primary Examiner*—Christine Oda
(74) *Attorney, Agent, or Firm*—Knobbe Martens Olson & Bear LLP (57) ABSTRACT

A capacitance type load sensor is provided with outer and inner tubes made of plastic and formed into a hollow circular cylinder shape and outer and inner electrodes respectively attached to the inner and outer peripheral faces of the outer and inner tubes. A coil spring is disposed within the interior space of the inner tube, and load-applied hooks of the coil spring are individually coupled to respective end walls of the outer and inner tubes. When a tensile load is applied to the hooks of the coil spring and hence the coil spring is elongated, a relative motion occurs between the outer and inner tubes so that the facing area between the outer and inner electrodes and accordingly the capacitance between these electrodes decrease. The load sensor measures the applied load based on an amount of change in the capacitance between before and after the application of the load.

7 Claims, 5 Drawing Sheets

CAPACITANCE TYPE LOAD SENSOR

BACKGROUND OF THE INVENTION

1. Technical Field

The present invention relates to a capacitance type load sensor for detecting load based on a change in capacitance caused by the load applied thereto.

2. Related Art

Conventional capacitance type load sensors comprise a pair of electrodes that are spaced and electrically insulated from each other to constitute a capacitor, and detect load on the basis of that change in the capacitance of the capacitor which is caused when one electrode applied with the load is flexed to change the distance between the electrodes.

Figure 11:
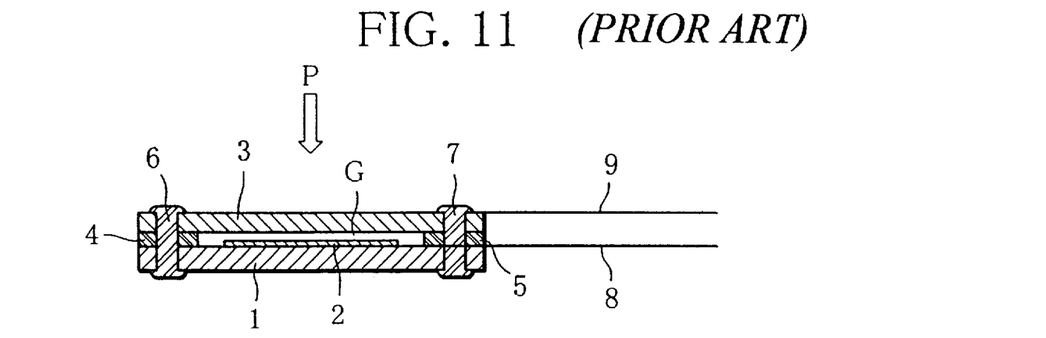
FIG. 11 is a longitudinal section view showing by way of example of a conventional capacitance type load sensor.

FIG. 11 shows, by way of example, a conventional capacitance type load sensor which comprises an insulating board 1 formed with an electrode pattern 2 and an electrode plate 3 made of stainless steel, for instance. The insulating board 1 and the electrode plate 3 are spaced from each other, with spacers 4, 5 interposed therebetween, and are connected with each other by means of rivets 6 and 7, to thereby constitute a capacitor. Lead wires 8, 9 are connected to the electrode pattern 2 and the electrode plate 3, respectively. When load is applied to the electrode plate 3 in the direction shown by arrow P to cause the electrode plate to be flexed so that the gap G between the electrode pattern 2 and the electrode plate 3 changes in magnitude and hence the capacitance of the capacitor changes, the load sensor detects such change in capacitance, as the load applied to the electrode plate through the medium of the lead wires 8, 9.

In the load sensor having the aforementioned construction, the measurement accuracy becomes higher with the increase in an amount of change in capacitance, i.e., an amount of flexure of the electrode plate 3 caused when load is applied. On the other hand, stress generated in the electrode plate 3 becomes greater with the increase in amount of flexure of the electrode plate 3. If the generated stress exceeds the elastic limit, fatigue limit or impact breakdown limit, the durability of the electrode plate 3 is lowered, so that the durability and reliability of the load sensor, especially long-term reliability thereof, may be worsened. As apparent from the foregoing explanation, when load is applied, the electrode plate 3 is desirable to be flexed by a large amount from the viewpoint of improving the measurement accuracy, but to be flexed by a small amount from the viewpoint of improving the reliability.

That is, in a load sensor for detecting load based on a change in capacitance of a capacitor comprised of an electrode pattern 2 formed on an insulating board 1 and an electrode plate 3 that is adapted to be flexed when the load is applied, a conflict arises between a solution for improvement of measurement accuracy and that for improvement of reliability, and hence it is difficult to improve both the measurement accuracy and the reliability at the same time.

SUMMARY OF THE INVENTION

An object of the present invention is to provide a capacitance type load sensor which is high in measurement accuracy and long-term reliability.

A capacitance type load sensor of this invention comprises a first electrode, a second electrode disposed to face the first electrode and to be spaced therefrom and cooperating with the first electrode to form a capacitor, first and second holding members made of an insulating material, and an elastic member having opposite end portions thereof associated with the first and second holding members, respectively. The first and second holding members support the first and second electrodes for relative motion in the direction along which a facing area between the electrodes changes, with the distance between the electrodes kept constant. The elastic member is elastically deformable in the direction of the relative motion between the first and second electrodes. Load to be measured by the load sensor is applied to the first and second holding members or to the elastic member.

In the load sensor of this invention, load is applied to the first and second holding members or to the elastic member, and hence no load is applied to the first and second electrodes. Thus, there is a low possibility of causing deformation or damage of the electrodes upon application of load, and accordingly the load sensor is excellent in long-term reliability. When the elastic member is elastically deformed upon application of load, a relative motion occurs between the first and second electrodes, respectively supported by the first and second holding members with which the opposite end portions of the elastic member are associated, with the electrode distance kept constant. Thus, a change occurs in the facing area between the electrodes and therefore the capacitance therebetween changes. The amount of change in the capacitance accurately indicates the magnitude of the load applied to the load sensor, so that the measurement accuracy of the load sensor is excellent. In this manner, the present invention provides a capacitance type load sensor which is high in measurement accuracy and long-term reliability.

In the present invention, preferably, the first and second electrodes are each formed into a hollow cylinder shape which is open at its at least one end face. The second electrode is disposed coaxially with the first electrode. More preferably, the first and second electrodes are each formed into a hollow circular cylinder shape.

With this preferred embodiment, the facing area between the first and second electrodes and accordingly an amount of change in the facing area per unit load become sufficiently large, without the need of making the transverse sectional dimensions of the electrodes large, thereby providing a load sensor which is compact in size and high in measurement accuracy.

In the present invention, preferably, the first and second electrodes are each formed into a hollow cylinder shape which is open at its opposite end faces. The first holding member is comprised of a hollow outer tube having a peripheral wall and an end wall formed integrally therewith at one end of the peripheral wall. The second holding member is comprised of a hollow inner tube disposed in the hollow outer tube and having a peripheral wall and an end wall formed integrally therewith. The outer and inner tubes are arranged for relative motion along the longitudinal axis of the load sensor. The first electrode is attached to the inner peripheral face of the peripheral wall of the outer tube, and the second electrode is attached to the outer peripheral face of the peripheral wall of the inner tube.

With this preferred embodiment, the first and second holding members positively hold the first and second electrodes for relative motion, with the electrode distance maintained constant. Thus, an amount of relative motion between the first and second electrodes caused by the application of load and accordingly an amount of change in the facing area between the electrodes accurately correspond to the magnitude of the applied load, whereby the measurement accuracy, in particular, of the load sensor is improved.

In the preferred embodiment, preferably, the elastic member is comprised of a coil spring having a coil portion and two extension portions extending from the coil portion outward along the longitudinal axis of the load sensor. The coil portion of the coil spring is disposed within the interior space of the second electrode, and the two extension portions of the coil spring are coupled to the end walls of the outer and inner tubes, respectively. The load to be measured by the load sensor is applied to at least one of the two extension portions of the coil spring.

With this preferred embodiment, when load is applied to one or both of the two extension portions of the coil spring, the coil portion of the coil spring is elastically deformed by an amount corresponding to the magnitude of the load. The amount of elastic deformation of the coil portion accurately indicates the magnitude of the applied load, thereby contributing to improved measurement accuracy of the load sensor. Further, the coil spring is high in strength, and the load is applied to one or both of the two extension portions of the coil spring which are respectively coupled to the end walls of the outer and inner tubes. This contributes to the improvement of the long-term reliability of the load sensor.

In the preferred embodiment having the outer and inner tubes, preferably, the outer tube has an end wall extension portion extending radially outwardly from the end wall of the outer tube beyond the peripheral wall of the outer tube, an outer shaft portion extending from the end wall of the outer tube outward along the longitudinal axis of the load sensor, and an inner shaft portion fitted in the interior space of the inner tube and extending from the end wall of the outer tube inward along the longitudinal axis of the load sensor. The inner tube has an end wall extension portion extending radially outwardly from the end wall of the inner tube beyond the peripheral wall of the inner tube, and an outer shaft portion extending from the end wall of the inner tube outward along the longitudinal axis of the load sensor. The elastic member is comprised of a coil spring disposed radially outwardly of the peripheral wall of the outer tube and having opposite ends thereof associated with the end wall extension portions of the outer and inner tubes, respectively. The load to be measured by the load sensor is applied to at least one of the outer shaft portions of the outer and inner tubes.

Alternatively, the outer tube has an outer shaft portion extending from the end wall of the outer tube outward along the longitudinal axis of the load sensor, an inner shaft portion fitted to the interior space of the inner tube and extending from the end wall of the outer tube inward along the longitudinal axis of the load sensor, and a second end wall extending radially inwardly from another end of the peripheral wall of the outer tube and formed with an opening permitting the inner tube to pass therethrough. The inner tube has an outer shaft portion extending from the end wall of the inner tube outward along the longitudinal axis of the load sensor, and a second end wall extending radially outwardly from another end of the peripheral wall of the inner tube and formed with an opening permitting the inner shaft portion of the outer tube to pass therethrough. The elastic member is comprised of a coil spring disposed between the inner peripheral face of the outer tube and the outer peripheral face of the inner tube and having opposite ends thereof associated with the second end walls of the outer and inner tubes, respectively. The load to be measured by the load sensor is applied to at least one of the outer shaft portions of the outer and inner tubes.

In either of the two just-mentioned preferred embodiments, one or both of the outer shaft portions of the outer and inner tubes of the load sensor receive the load, and hence no load is applied to the first and second electrodes respectively attached to the outer and inner tubes. Accordingly, the long-term reliability of the load sensor is improved. Further, an amount of relative motion between the outer and inner tubes upon application of load is regulated by the coil spring that is associated with the outer and inner tubes and elastically deformed by an amount accurately corresponding to the magnitude of the applied load. Thus, a change in the facing area between the first and second electrodes and therefore a change in the capacitance between the electrodes accurately indicate the magnitude of the applied load, thereby contributing to the improvement of the measurement accuracy of the load sensor. Furthermore, since the inner shaft portion of the outer tube is fitted in the interior space of the inner tube, the outer and inner tubes make a smooth relative motion with the electrode distance kept constant, thereby contributing to the improvement in measurement accuracy.

In the present invention, preferably, the first and second electrodes are each formed into a hollow cylindrical shape which is open at its opposite end faces. At least one of the first and second electrodes is configured to have a self-shape-sustaining ability. The first and second holding members are comprised of insulating bushings fitted in respective one end portions of the first and second electrodes.

With this preferred embodiment, the first and second electrodes of a hollow cylinder shape are held by means of the insulating bushings respectively fitted thereto, thereby making it possible to reduce manufacturing costs of the load sensor.

In the just-mentioned preferred embodiment, preferably, the elastic member is comprised of a coil spring having a coil portion and two extension portions extending from opposite ends of the coil portion outward along the longitudinal axis of the load sensor. The coil spring is disposed within the interior space of the second electrode, and the two extension portions of the coil spring are respectively coupled to the insulating bushings. The load to be measured by the load sensor is applied to at least one of the two extension portions of the coil spring.

With this preferred embodiment, load is applied to one or both of the two extension portions of the coil spring which are respectively coupled to the two insulating bushings. This contributes to the improvement in the long-term reliability of the load sensor. Further, an amount of elastic deformation of the coil portion of the coil spring upon application of load accurately represents the magnitude of the applied load, contributing to the improvement in the measurement accuracy of the load sensor.

More preferably, the load sensor further includes an insulating spacer disposed between the inner peripheral face of the first electrode and the outer peripheral face of the second electrode. The insulating spacer is fixed to the inner peripheral face of the first electrode or to the outer peripheral face of the second electrode.

With this preferred embodiment, the first and second electrodes are positively electrically insulated from each other and the electrode distance is held constant by means of the insulating spacer disposed therebetween, thereby contributing to the improvement in measurement accuracy and long-term reliability of the load sensor.

In the present invention, preferably, the elastic modulus of the elastic member is determined such that an amount of elastic deformation per unit load becomes sufficiently large in a load range within which the load to be measured varies.

With this preferred embodiment, an amount of relative motion per unit load between the first and second electrodes and therefore an amount of change in the facing area between the electrodes, i.e., an amount of change in capacitance between the electrodes, become sufficiently large, improving the measurement accuracy of the load sensor.

DETAILED DESCRIPTION

With reference to FIGS. 1–7, a capacitance type load sensor according to a first embodiment of this invention will be explained hereinbelow.

The capacitance type load sensor of the present embodiment comprises an outer tube 11 formed into a hollow circular cylinder shape and having a peripheral wall 11a and an end wall 11b formed integrally therewith at one end of the peripheral wall 11a, and an inner tube 12 of a hollow circular cylinder shape having a peripheral wall 12a and an end wall 12b formed integrally therewith at one end of the peripheral wall 12a. The outer and inner walls 11, 12 are made of rigid plastic (electrically insulating material). The peripheral wall 12a of the inner tube is formed at its outer peripheral face with two projections 12e diametrically opposed to each other, and the peripheral wall 11a of the outer tube is formed at its inner peripheral face with two grooves 11e to which the projections 12e of the inner tube 12 are slidably fitted, respectively, whereby the outer and inner tubes 11 and 12 are relatively movable to each other in the axial direction of the load sensor.

The load sensor further comprises an outer electrode (first electrode) 21 attached to the inner peripheral face of the peripheral wall 11a of the outer tube 11, and an inner electrode (second electrode) 22 attached to the outer peripheral face of the peripheral wall 12a of the inner tube 12. These electrodes 21, 22 are disposed to face each other and to be spaced from each other, thereby constituting a capacitor. The outer and inner electrodes 21, 22 are arranged to be relatively movable to each other upon relative movement between the outer and inner tubes 11, 12, so that the facing area between the electrodes 21, 22 may change, with the gap G therebetween kept constant. In other words, the outer and inner tubes 11, 12 constitute first and second holding members for holding the outer and inner electrodes 21, 22 for relative motion.

The outer and inner electrodes 21, 22 are respectively formed with terminals 21a, 22a that are integrally therewith. These terminals 21a, 22a project to the outside of the outer and inner tubes 11, 12 via through holes formed in the end walls 11b, 12b of the tubes. Lead wires (not shown), corresponding to the lead wires 8, 9 shown in FIG. 11, are connected to the terminals 21a, 22a and to an electrical circuit section (not shown) of the load sensor. The electrical circuit section is arranged to measure load applied to the load sensor based on the facing area between the outer and inner electrodes 21, 22 connected thereto through the lead wires and therefore based on the capacitance (electrostatic capacity) between these electrodes. Since the electrical circuit section may be configured as conventionally known, explanations of the circuit arrangement will be omitted herein.

Figure 1:
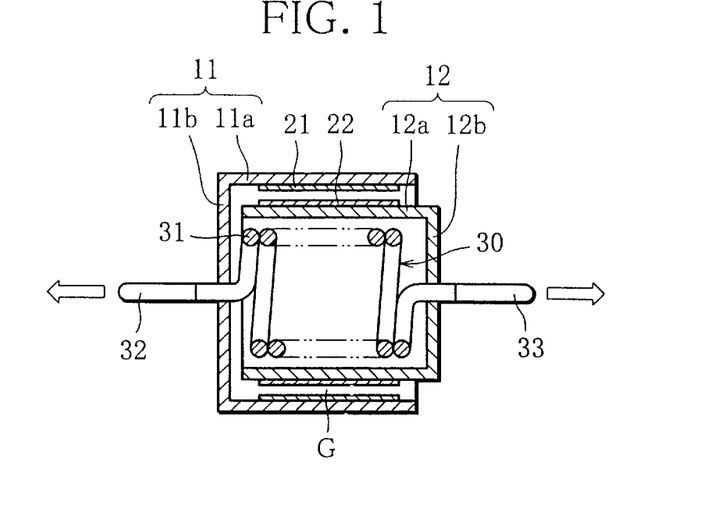
FIG. 1 is a longitudinal section view of a capacitance type load sensor according to a first embodiment of the present invention.

The load sensor further comprises an elastic member which is elastically deformable in the direction of relative movement between the outer and inner electrodes 21, 22. In this embodiment, the elastic member is comprised of a coil spring 30 having a coil portion 31 and two extension portions 32, 33 extending from the opposite ends of the coil portion outward along the direction of the longitudinal axis of the load sensor. The coil spring 30 is disposed in the interior space of the inner tube 12, and the two extension portions 32, 33 of the coil spring 30 are coupled to the end walls 11b, 12b of the outer and inner tubes 11, 12, respectively.

The load sensor of this embodiment is arranged for measuring a tensile load, and the extension portions 32, 33 are configured in the form of hooks applied with the tensile load. These hooks 32, 33, passing through slots (one of which is shown by reference numeral 11c in FIGS. 2 and 4) formed in the end walls 11b, 12b of the outer and inner tubes 11, 12, respectively, are disposed outside the outer and inner tubes. The hooks 32, 33 are fixed to these tubes 11 and 12, respectively, by means of adhesive, for instance, in a state that the proximal end portions thereof are fitted in grooves formed in hook-fastening portions 11d, 12d of the end walls 11b, 12b of the outer and inner tubes.

In the following, the operation of the load sensor will be explained.

Figure 2:
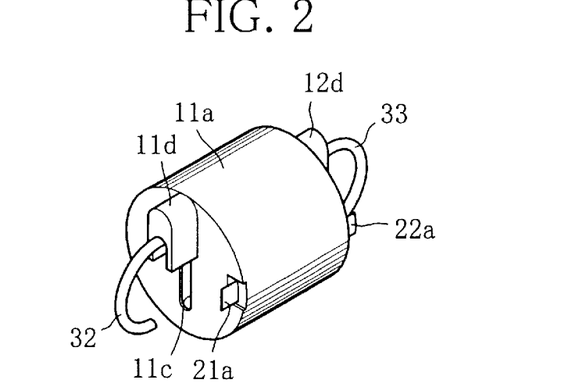
FIG. 2 is a perspective view showing the load sensor of FIG. 1 in a state where no load is applied thereto.
Figure 3:
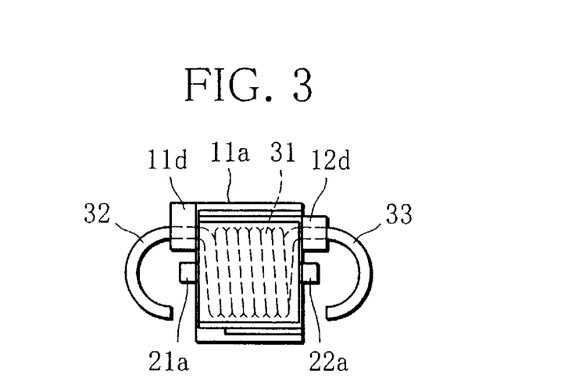
FIG. 3 is a front view showing the load sensor in a state where no load is applied thereto.

When no load is applied to the coil spring 30 of the load sensor, the outer and inner electrodes 21, 22 approximately fully face each other, so that the facing area between the electrodes 21, 22 and therefore the capacitance therebetween take a maximum value, as understood from FIGS. 2 and 3.

Figure 4:
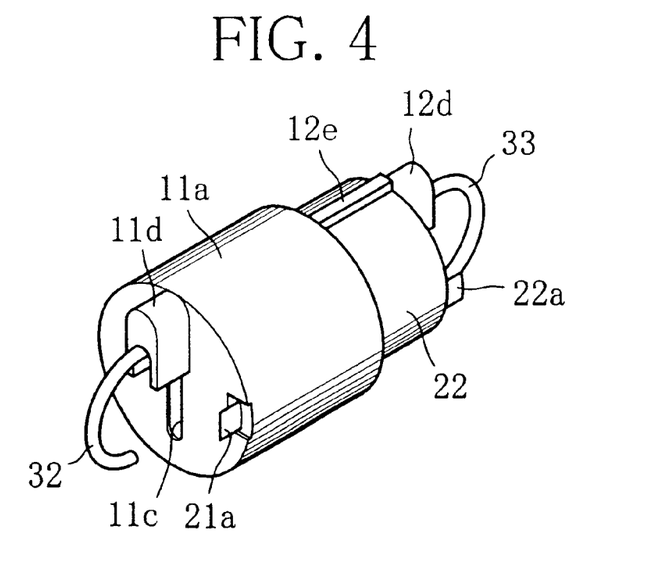
FIG. 4 is a perspective view showing the load sensor in a state where load is applied thereto.
Figure 5:
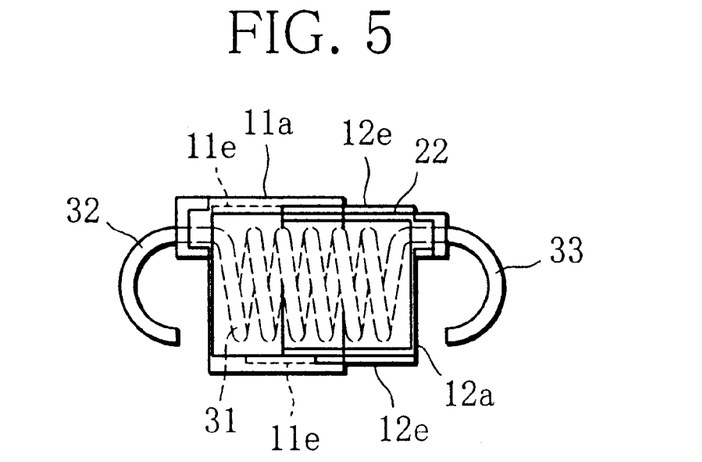
FIG. 5 is a front view showing the load sensor in a state where load is applied thereto.
Figure 6:
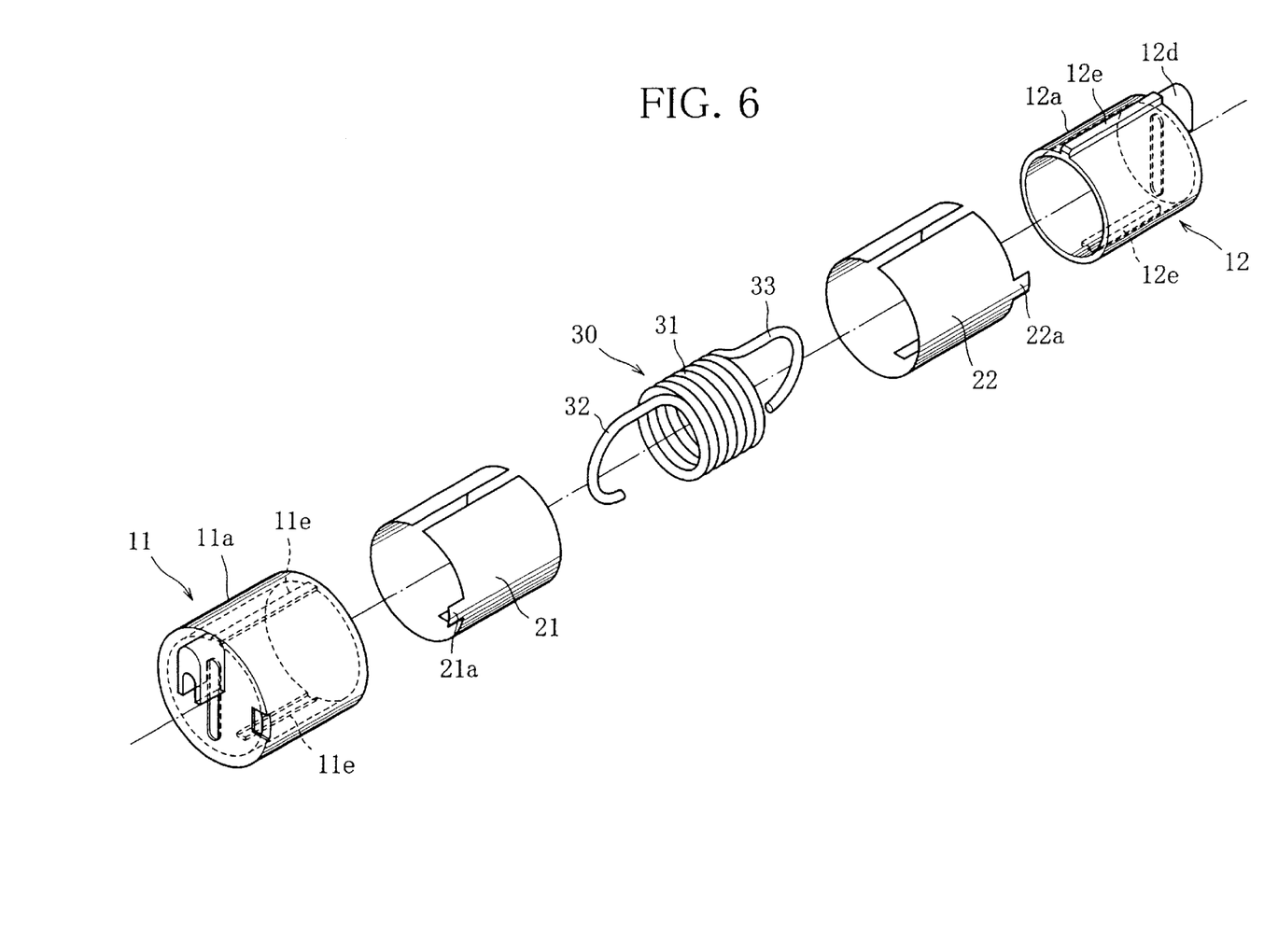
FIG. 6 is an exploded perspective view of the load sensor shown in FIG. 1.
Figure 7:
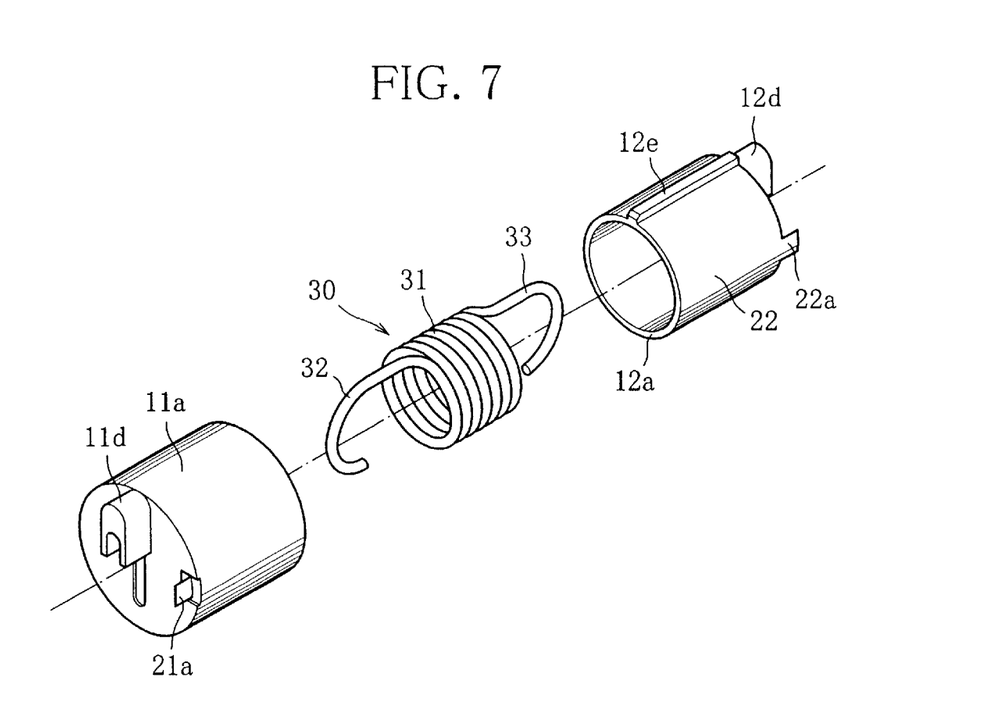
FIG. 7 is an exploded perspective view showing the load sensor in a case where an outer tube and an outer electrode are assembled together and an inner tube and an inner electrode are assembled together.

When a tensile load is applied to the hooks 32, 33 of the coil spring 30, the coil portion 31 of the coil spring 30 is elongated in proportion to the magnitude of the tensile load. Thus, the outer and inner tubes 11, 12 are moved relatively to each other along the direction of the longitudinal axis of the load sensor, thereby decreasing the facing area between the outer and inner electrodes 21, 22 and hence the capacitance between the electrodes.

The electrical circuit section of the load sensor monitors the capacitance between the outer and inner electrodes 21, 22 and measures the capacitance value when the tensile load and the elongation of the coil spring 30 are balanced and the capacitance becomes stabilized. On the basis of the measured capacitance value, the electrical circuit section measures the load applied to the load sensor.

With the load sensor of this embodiment, an amount of change in capacitance between before and after the application of load is in proportion to an amount of elongation of the coil portion 31 of the coil spring 30. Thus, the resolving power, i.e., the accuracy of the load measurement can be improved by selecting the spring constant or elastic modulus of the coil spring 30 in such a manner that an amount of elastic deformation of the coil portion 31 per unit load is sufficiently large in a load range within which load to be measured is expected to vary. Moreover, since no load is applied to the outer and inner electrodes 21, 22, there is a low possibility of causing deformation of and damage to the electrodes, so that the long-term reliability of the load sensor may be improved.

Figure 8:
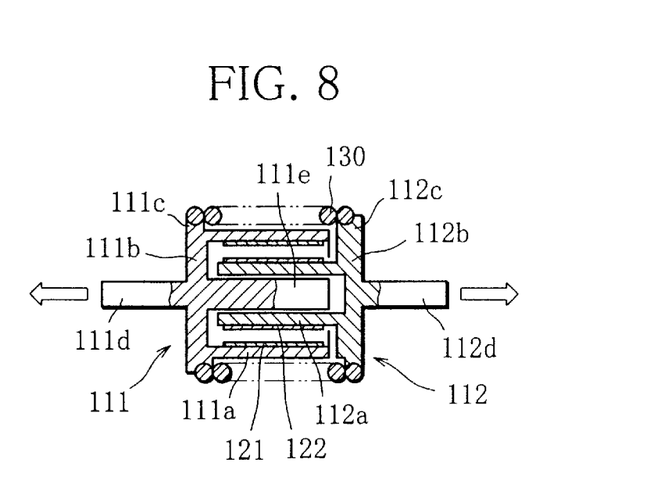
FIG. 8 is a longitudinal section view of a load sensor according to a second embodiment of this invention.

With reference to FIG. 8, a load sensor according to a second embodiment of the present invention will be explained.

As compared to the load sensor of the first embodiment configured to apply load to the coil spring having the coil portion disposed in the interior space of the inner tube 12, the load sensor of this embodiment is different in that the coil spring is disposed radially outwardly of the outer tube and load is applied to the outer and inner tubes.

As shown in FIG. 8, the outer and inner tubes 111, 112 serving as first and second holding members are each formed, as a whole, into a hollow circular cylinder shape which is open at its one end face.

The outer tube 111 is comprised of a peripheral wall 111a having an inner peripheral face to which the outer electrode 121 is attached, an end wall 111b integrally formed with the peripheral wall 111a at one end of the peripheral wall 111a, an end wall extension portion (flange portion) 111c extending radially outwardly from the end wall 111b beyond the peripheral wall 111a, an outer shaft portion (load-applied portion) 111d extending from the end wall 111b outward along the longitudinal axis of the load sensor, and an inner shaft portion (center shaft) 111e extending from the end wall 111b inward along the longitudinal axis of the load sensor and slidably fitting in the interior space of the inner tube 112.

The inner tube 112 is comprised of a peripheral wall 112a having an outer peripheral face to which the inner electrode 122 is attached, an end wall 112b formed integrally with the peripheral wall 112a at one end of the peripheral wall 112a, an end wall extension portion (flange portion) 112c extending radially outwardly from the end wall 112b beyond the peripheral wall 112a, and an outer shaft portion (load-applied portion) 112d extending from the end wall 112b outward along the longitudinal axis of the load sensor.

The coil spring 130 is disposed radially outwardly of the peripheral wall 111a of the outer tube, and the opposite ends of the coil spring 130 are fixed to the end wall extension portions 111c, 112c of the outer and inner tubes 111, 112, respectively.

Basically, the load sensor shown in FIG. 8 operates in the same manner as the load sensor shown in FIG. 1. As to the operation, brief explanation will be given hereinbelow.

When tensile load is applied to the load-applied portions 111d, 112d of the outer and inner tubes 111, 112 of the load sensor, a relative motion occurs in the axial direction of the load sensor between the outer tube 111, provided with the outer electrode 121 and having the central shaft 111e thereof slidably fitted to the interior space of the inner tube 112, and the inner tube 11 to which the inner electrode 122 is attached, with the distance between these electrodes maintained constant. Thus, the coil spring 130 whose opposite ends are fixed to the outer and inner tubes 111, 112 is elongated. Then, with the progress of the relative motion between the outer and inner tubes 111, 112, the facing area between the outer and inner electrodes 121, 122 and hence the capacitance therebetween decrease. Thereafter, when the applied load and the spring force corresponding to the elongation of the coil spring 130 are balanced so that the capacitance between the electrodes is settled, the electrical circuit section of the load sensor makes the load measurement based on an amount of change in the capacitance between before and after the application of the load. The load sensor is high in measurement accuracy and long-term reliability.

Figure 9:
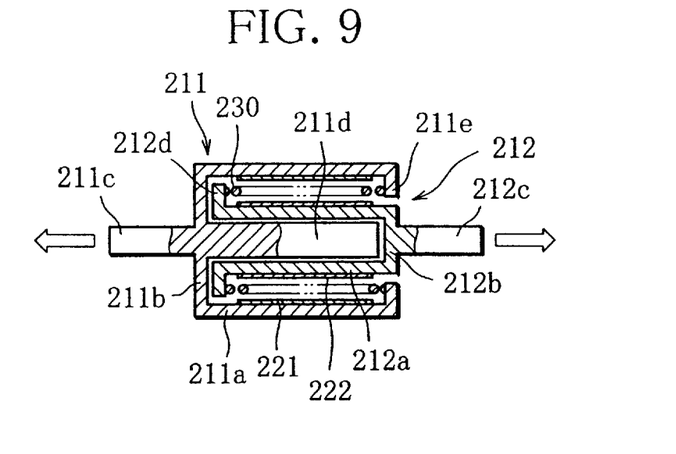
FIG. 9 is a longitudinal section view of a load sensor according to a third embodiment of this invention.

With reference to FIG. 9, a load sensor according to a third embodiment of this invention will be explained.

The load sensor of the present embodiment is common to the load sensor shown in FIG. 8 in that load is applied to the outer and inner tubes, but is different therefrom in that the coil spring is disposed between the outer and inner tubes.

As shown in FIG. 9, the outer and inner tubes 211, 212 serving as first and second holding members are each formed, as a whole, into a hollow circular cylinder shape which is open at its one end face.

The outer tube 211 is comprised of a peripheral wall 211a having an inner peripheral face to which the outer electrode 221 is attached, an end wall 211b formed integrally with the peripheral wall 211a at one end of the peripheral wall 211a, an outer shaft portion (load-applied portion) 211c extending from the end wall 211b outward along the longitudinal axis of the load sensor, an inner shaft portion (central shaft) 211d extending from the end wall 211b inward along the longitudinal axis of the load sensor and fitted in the interior space of the inner tube 212, and a second end wall (flange portion) 211e extending radially inwardly from another end of the peripheral wall 211a and formed with an opening permitting the inner tube 212 to pass therethrough.

The inner tube 212 is comprised of a peripheral wall 212a having an outer peripheral face to which the inner electrode 222 is attached, an end wall 212b formed integrally with the peripheral wall 212a at one end of the peripheral wall 212a, an outer shaft portion (load-applied portion) 212c extending from the end wall 212b outward along the longitudinal axis of the load sensor, and a second end wall (flange portion) 212d extending radially outwardly from another end of the peripheral wall 211a and formed with an opening which permits the inner shaft portion 211d of the outer tube 211 to pass therethrough.

The coil spring 230 is disposed between the outer and inner tubes 211, 212, and the opposite ends of the coil spring 230 abut against the second end walls 211e, 212d of the outer and inner tubes 211, 212, respectively.

Basically, the load sensor shown in FIG. 9 operates in the same manner as that shown in FIG. 8. A brief explanation on the operation of the load sensor of FIG. 9 will be given below.

When tensile load is applied to the load-applied portions 211c, 212c of the outer and inner tubes 211, 212, a relative motion occurs in the direction of the longitudinal axis of the load sensor between the outer tube 211, provided with the outer electrode 221 and having the central shaft 211d thereof slidably fitted in the interior space of the inner tube 212, and the inner tube 212 to which the inner electrode 222 is attached, with the distance between the outer and inner electrodes maintained constant. Thus, the coil spring 230 whose opposite ends abut against the outer and inner tubes 211, 212 is compressed. With the progress of the relative motion between the outer and inner tubes 211, 212, the facing area between the outer and inner electrodes 221, 222 and therefore the capacitance therebetween decrease. Subsequently, when the applied load and the spring force corresponding to the compression amount of the coil spring 230 are balanced, the electrical circuit section of the load sensor makes the load measurement based on the amount of change in the capacitance between before and after the load application. The load sensor has high measurement accuracy and high long-term reliability.

Figure 10:
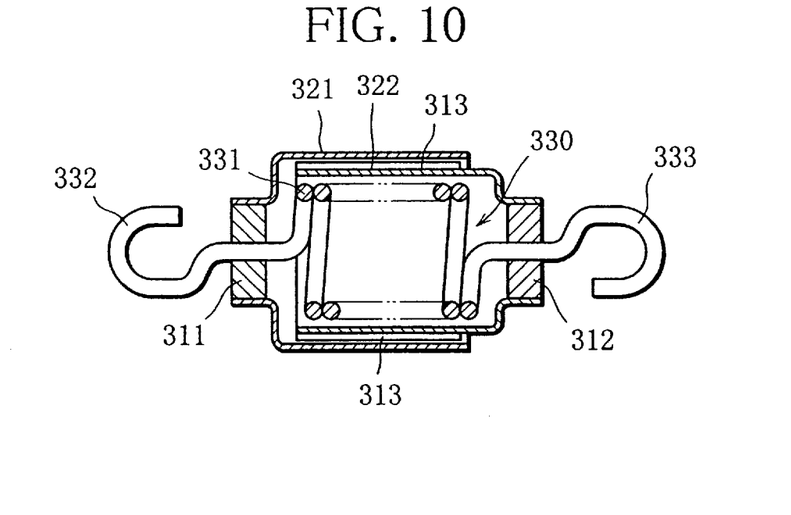
FIG. 10 is a longitudinal section view of a load sensor according to a fourth embodiment of this invention.

With reference to FIG. 10, a load sensor according to a fourth embodiment of the present invention will be explained.

As compared to the load sensors according to the first, second and third embodiments in which the outer and inner electrodes are supported on the outer and inner tubes, respectively, the load sensor of this embodiment is different in that the outer and inner electrodes are each comprised of a drawn product having a thickness enough to provide the product with a self-sustaining shape, whereby the provision of the outer and inner tubes can be omitted for cost reduction.

As shown in FIG. 10, the outer and inner electrodes 321, 322 are each formed in a hollow circular cylinder which is open at its opposite end faces. As already mentioned, the electrodes 321, 322 are each comprised of a drawn product having the self-shape-sustaining ability. Electrically insulating bushings 311, 312 serving as the first and second holding members are fitted in respective one end portions of the outer and inner electrodes 321, 322. Between the inner peripheral face of the outer electrode 321 and the outer peripheral face of the inner electrode 322 is disposed an electrically insulating spacer 313 for maintaining the distance between the electrodes constant while permitting relative motion between these electrodes in the axial direction of the load sensor. In the present embodiment, a plurality of insulating spacers 313 spaced from one another circumferentially of the inner electrode 322 are fixed to the outer peripheral face of the inner electrode. Instead, a plurality of insulating spacers may be fixed at circumferential intervals to the inner peripheral face of the outer electrode 321, or a single insulating spacer may be provided on the entirety of the outer peripheral face of the inner electrode 322 or on the entirety of the inner peripheral face of the outer electrode 321.

A coil spring 330 disposed in the interior space of the inner electrode 322 has a coil portion 331 and two extension portions (hooks for load application) 332, 333 respectively extending from the opposite ends of the coil portion outward along the longitudinal axis of the load sensor. These two hooks 332, 333 have proximate end portions thereof passing through the insulating bushings 311, 312 and intermediate portions thereof coupled to the insulating bushings 311, 312, respectively.

Basically, the load sensor of this embodiment operates in the same manner as that of the first embodiment. In the following, a brief explanation of the operation of the load sensor will be given.

When tensile load is applied to the hooks 332, 333 of the coil spring 330, the coil portion 331 of the coil spring 330 is elongated in proportion to the magnitude of the tensile load, and hence a relative motion occurs between the insulating bushings 311, 312 in the axial direction of the load sensor, so that the facing area between the outer and inner electrodes 321, 322 decreases and thus the capacitance between these electrodes decreases. The electrical circuit section of the load sensor measures the load based on an amount of change in capacitance between the outer and inner electrodes 321, 322 between before and after the application of the load. The load sensor has high measurement accuracy and high long-term reliability.

The present invention is not limited to the first through fourth embodiments, and may be modified in various manners.

For instance, in the first to fourth embodiments, both the outer and inner electrodes are formed into a cylinder shape which is circle in transverse cross section. However, the outer and inner electrodes may be formed into a cylinder having a shape other than circle in transverse cross section. Further, it is not indispensable to use a coil spring as an elastic member that is elastically deformable as a relative motion occurs between the outer and inner electrodes. Instead of using such a coil spring, a rubber member may be employed for the elastic member.

In the fourth embodiment, both the outer and inner electrodes are comprised of a drawn product. However, only one of the electrodes may be comprised of a drawn product and the other electrode may be supported on a plastic tube as in the case of the first to third embodiments.

Although load sensors adapted to measure tensile load applied thereto have been explained in the first to fourth embodiments, the present invention is also applicable to a load sensor for measuring compression load. To this end, for example, a coil spring which is compressed upon application of load may be employed in the load sensor shown in FIG. 1, instead of using a coil spring which is elongated when applied with load.

What is claimed is:

1. A capacitance load sensor, comprising:
   a first electrode;
   a second electrode disposed to face said first electrode and to be spaced therefrom and cooperating with said first electrode to form a capacitor;
   first and second holding members made of an insulating material, said first and second holding members supporting said first and second electrodes for relative motion in the direction along which a facing area between said electrodes changes, with a distance between said electrodes kept constant;
   an elastic member having opposite end portions thereof associated with said first and second holding members, respectively, said elastic member being elastically deformable in the direction of the relative motion between said first and second electrodes,
   wherein load to be measured by the load sensor is applied to said first and second holding members or to said elastic member,
   wherein said first and second electrodes are each formed into a hollow cylinder shape which is open at its opposite end faces,
   wherein said first holding member is comprised of a hollow outer tube having a peripheral wall and an end wall formed integrally therewith at one end of the peripheral wall,
   wherein said second holding member is comprised of a hollow inner tube disposed in the hollow outer tube and having a peripheral wall and an end wall formed integrally therewith,
   wherein said outer and inner tubes are arranged for relative motion along a longitudinal axis of said load sensor, wherein said first electrode is attached to the inner peripheral face of the peripheral wall of the outer tube, and wherein said second electrode is attached to the outer peripheral face of the peripheral wall of the inner tube.

2. The load sensor according to claim 1, wherein said elastic member is comprised of a coil spring having a coil portion and two extension portions extending from the coil portion outward along the longitudinal axis of the load sensor, said coil portion of the coil spring is disposed within an interior space of said second electrode, said two extension portions of the coil spring are coupled to the end walls of the outer and inner tubes, respectively, and the load to be measured by the load sensor is applied to at least one of the two extension portions of the coil spring.

3. The load sensor according to claim 1, wherein said outer tube has an end wall extension portion extending radially outwardly from the end wall of the outer tube beyond the peripheral wall of the outer tube, an outer shaft portion extending from the end wall of the outer tube outward along the longitudinal axis of the load sensor, and an inner shaft portion fitted in the interior space of the inner tube and extending from the end wall of the outer tube inward along the longitudinal axis of the load sensor, said inner tube has an end wall extension portion extending radially outwardly from the end wall of the inner tube beyond the peripheral wall of the inner tube, and an outer shaft portion extending from the end wall of the inner tube outward along the longitudinal axis of the load sensor, said elastic member is comprised of a coil spring disposed radially outwardly of the peripheral wall of the outer tube and having opposite ends thereof associated with the end wall extension portions of the outer and inner tubes, respectively, and the load to be measured by the load sensor is applied to at least one of the outer shaft portions of the outer and inner tubes.

4. The load sensor according to claim 1, wherein said outer tube has an outer shaft portion extending from the end wall of the outer tube outward along the longitudinal axis of the load sensor, an inner shaft portion fitted to the interior space of the inner tube and extending from the end wall of the outer tube inward along the longitudinal axis of the load sensor, and a second end wall extending radially inwardly from another end of the peripheral wall of the outer tube and formed with an opening permitting the inner tube to pass therethrough, said inner tube has an outer shaft portion extending from the end wall of the inner tube outward along the longitudinal axis of the load sensor, and a second end wall extending radially outwardly from another end of the peripheral wall of the inner tube and formed with an opening permitting the inner shaft portion of the outer tube to pass therethrough;

said elastic member is comprised of a coil spring disposed between the inner peripheral face of the outer tube and the outer peripheral face of the inner tube and having opposite ends thereof associated with the second end walls of the outer and inner tubes, respectively, and the load to be measured by the load sensor is applied to at least one of the outer shaft portions of the outer and inner tubes.

5. A capacitance load sensor, comprising:

a first electrode;

a second electrode disposed to face said first electrode and to be spaced therefrom and cooperating with said first electrode to form a capacitor;

first and second holding members made of an insulating material, said first and second holding members supporting said first and second electrodes for relative motion in the direction along which a facing area between said electrodes changes, with a distance between said electrodes kept constant;

an elastic member having opposite end portions thereof associated with said first and second holding members, respectively, said elastic member being elastically deformable in the direction of the relative motion between said first and second electrodes, wherein load to be measured by the load sensor is applied to said first and second holding members or to said elastic member, wherein said first and second electrodes are each formed into a hollow cylindrical shape which is open at its opposite end faces, wherein at least one of the first and second electrodes is configured to have a self-shape-sustaining ability, and wherein said first and second holding members are comprised of insulating bushings fitted in respective one end portions of the first and second electrodes.

6. The load sensor according to claim 5, wherein said elastic member is comprised of a coil spring having a coil portion and two extension portions extending from opposite ends of the coil portion outward along the longitudinal axis of the load sensor, said coil spring is disposed within an interior space of said second electrode, and said two extension portions of the coil spring are respectively coupled to the insulating bushings, and the load to be measured by the load sensor is applied to at least one of the two extension portions of the coil spring.

7. The load sensor according to claim 5 or 6, further including:

an insulating spacer disposed between the inner peripheral face of said first electrode and the outer peripheral face of said second electrode, wherein said insulating spacer is fixed to the inner peripheral face of said first electrode or to the outer peripheral face of said second electrode.

* * * * *